United States Patent
Lyons (10) Patent No.: US 9,041,379 B2
(45) Date of Patent: May 26, 2015

(54) BOOTSTRAP STARTUP AND ASSIST CIRCUIT

(75) Inventor: Steven Lyons, Kitchener (CA)

(73) Assignee: Lumastream Canada ULC, Calgary (CA)

( * ) Notice: Subject to any disclaimer, the term of this patent is extended or adjusted under 35 U.S.C. 154(b) by 464 days.

(21) Appl. No.: 13/382,721

(22) PCT Filed: Sep. 10, 2010

(86) PCT No.: PCT/CA2010/001415
§ 371 (c)(1),
(2), (4) Date: Jan. 11, 2012

(87) PCT Pub. No.: WO2011/029194
PCT Pub. Date: Mar. 17, 2011

(65) Prior Publication Data
US 2012/0262144 A1    Oct. 18, 2012

Related U.S. Application Data (60) Provisional application No. 61/241,173, filed on Sep. 10, 2009.

(51) Int. Cl.
| | |
|---|---|
| H02M 1/36 | (2007.01) |
| H05B 33/08 | (2006.01) |
| H02M 3/156 | (2006.01) |
| H02M 3/158 | (2006.01) |

(52) U.S. Cl.
CPC ........... *H05B 33/0815* (2013.01); *Y02B 20/346* (2013.01); *Y10S 323/901* (2013.01)

(58) Field of Classification Search
CPC ......... H02M 1/36; H02M 1/42; H02M 3/155; H02M 3/156; H02M 3/1582; H02M 2001/0003; H02M 2001/0006; H02M 2001/42; H02M 2001/4291
USPC .................................... 363/49; 323/901, 288
See application file for complete search history.

(56) References Cited

U.S. PATENT DOCUMENTS

| | | | |
|---|---|---|---|
| 5,155,670 A | 10/1992 | Brian | |
| 6,069,805 A * | 5/2000 | Anderson, Jr. | 363/49 |
| 7,391,630 B2 * | 6/2008 | Acatrinei | 363/89 |
| 7,501,805 B2 * | 3/2009 | Chen et al. | 323/282 |
| 7,719,245 B2 * | 5/2010 | Li et al. | 323/282 |
| 2008/0246444 A1 * | 10/2008 | Shao et al. | 323/207 |

OTHER PUBLICATIONS

Lu, et al., "Single-stage AC-DC power-factor-corrected voltage regulator with reduced intermediate bus voltage stress", IEE Proceedings, Sep. 2003, pp. 506-514, vol. 150, No. 5.

(Continued)

*Primary Examiner* — Gary L Laxton
(74) *Attorney, Agent, or Firm* — Gowling Lafleur Henderson LLP; Jeffrey W. Wong

(57) ABSTRACT

A bootstrap assist circuit and a startup circuit comprising a voltage controlled switch and a startup ramp voltage generator connected to the voltage controlled switch that will control a high side switch, a dimming interface or an enable/disable input function. Said system is used to provide a bootstrap technique to continuously switch a floating high side switch (MOSFET) by continuously charging a capacitor and then "level shifting" said capacitor voltage across the gate and source of the said high side switch to turn the switch on.

7 Claims, 9 Drawing Sheets

(56) References Cited

OTHER PUBLICATIONS

Canadian Intellectual Property Office As International Searching Authority, International Search Report and Written Opinion for International Patent App. No. PCT/CA2010/001415, Dec. 22, 2010.

\* cited by examiner

BOOTSTRAP STARTUP AND ASSIST CIRCUIT

CROSS REFERENCE TO RELATED APPLICATIONS

This application claims the benefit of U.S. Provisional Application No. 61/241,173 filed Sep. 10, 2009, which is incorporated herein by reference.

FIELD OF THE DISCLOSURE

The disclosure is directed generally at a power supply conversion system and more specifically at a bootstrap startup and assist circuit for a power supply and the like.

BACKGROUND OF THE DISCLOSURE

With the rapid increase in Light Emitting Diode (LED) efficacies for high powered LEDs compared to common light sources, the latest LED technologies have exceeded the capabilities of incandescent and halogen sources and are now starting to compete with fluorescent, mercury vapour, metal halide and sodium lighting sources. In addition to better energy usage, LEDs also have considerable advantages over traditional light sources such as longer working life and better durability.

Solid State Lighting (SSL) systems that incorporate LEDs have the potential to generate energy savings if the power sources used to power them are energy efficient as well.

Various energy efficiency standards have been developed for consumer products including external power supplies and lighting fixtures. The Energy Star Program created by the Environmental Protection Agency (EPA) has recently established industry wide requirements for Solid State Lighting (SSL) products. The principle energy efficiency metric used is the luminaire efficacy whereby luminaire efficacy is defined as net light output from the fixture divided by input power.

Therefore, there is provided a method and apparatus for a bootstrap startup and assist circuit.

SUMMARY OF DISCLOSURE

The present disclosure relates generally to a high efficiency power converter for HB LED (High Brightness Light Emitting Diodes) lighting systems and in particular to a non isolated power converter with a constant current output. Applications for the converter include, but are not limited to, being used in LED street lighting and LED industrial and commercial lighting applications such as high bay or low bay lighting systems.

The disclosure is also directed at a bootstrap assist and start up circuit for coupling with a power factor correction (PFC) transition mode (TM) control and high side, low side MOSFET gate drive to control a two-switch buck-boost non-isolated converter.

Such embodiments of the present disclosure also include a unique start up circuit and "bootstrap" method to control turn on of the high side switch and an optional dimming interface and optional enable/disable input function.

In another embodiment, there is provided a bootstrap technique which is a method used to continuously switch a floating high side switch such as a MOSFET by means of continuously charging a capacitor and then "level shifting" this capacitor voltage across the gate and source of the high side switch to turn the switch on.

Other aspects and features of the present application will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein:

FIG. 4a is a schematic diagram of a bootstrap assist and start up circuit with a bootstrap capacitor charge with low side switch on;

DETAILED DESCRIPTION

The disclosure is directed at a method and apparatus for a bootstrap startup and assist circuit.

Figure 1:
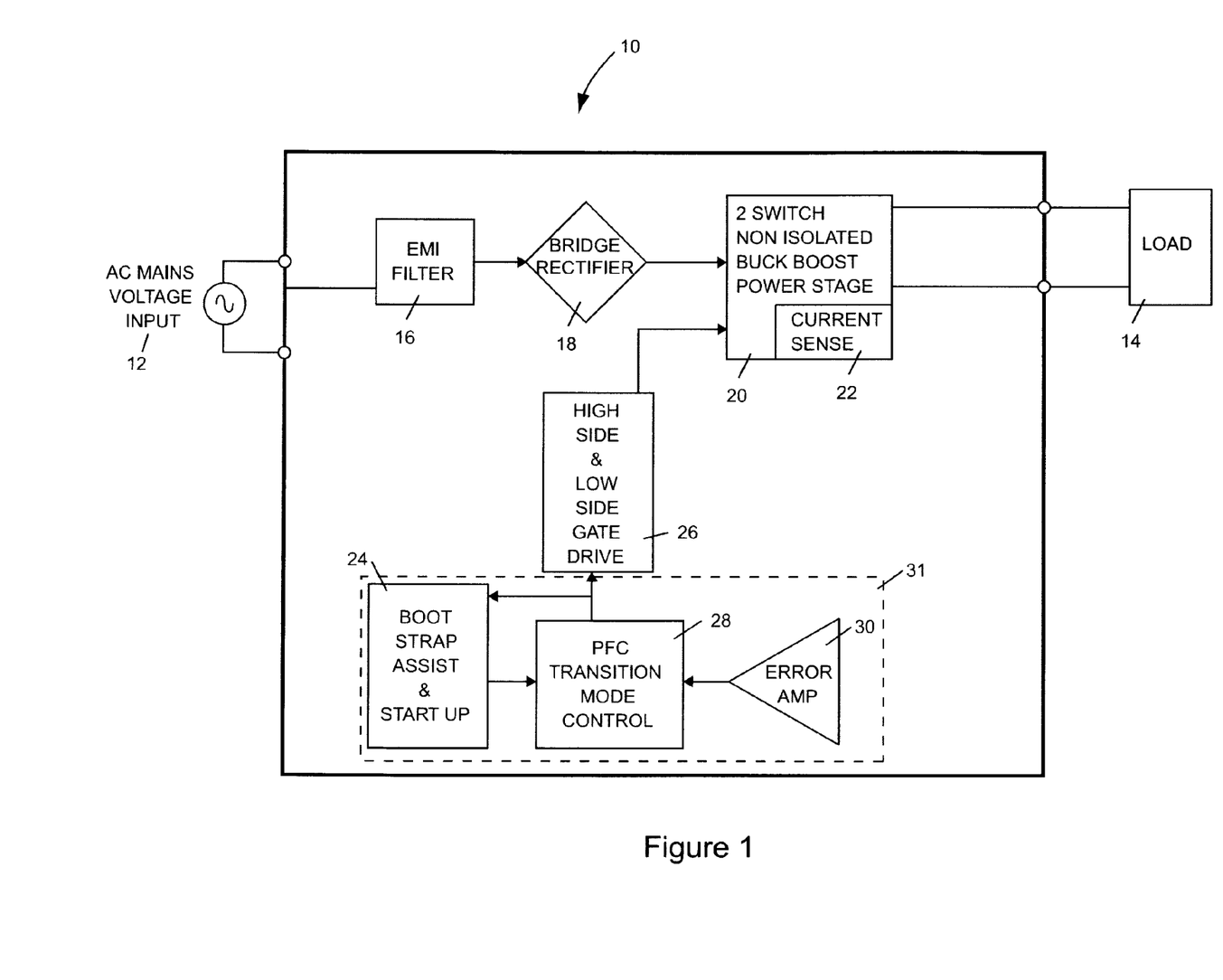
FIG. 1 is a block diagram of a power factor corrected buck-boost converter with a constant current output.
Figure 3:
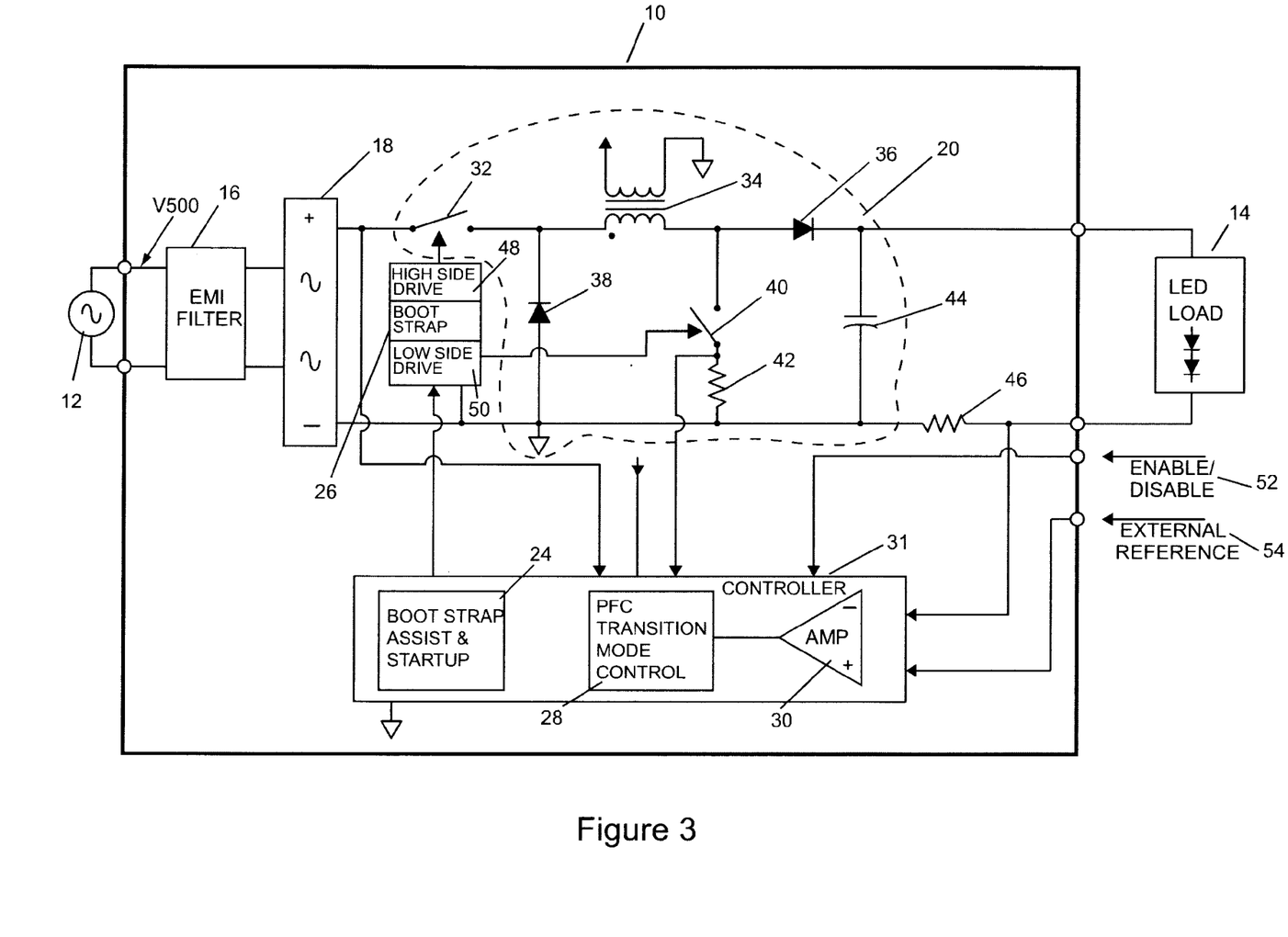
FIG. 3 is a schematic diagram of a non-isolated, power factor corrected buck boost converter with constant current output.

Turning to FIG. 1, a block diagram of a power factor corrected buck-boost converter with constant current output is shown. The converter 10 receives an input from a power supply such as an AC mains voltage input 12 and supplies an output to a load 14. Some examples of loads include, but are not limited to, a set of light emitting diodes (LEDs), or any other component or apparatus requiring a constant current such as a rechargeable battery requiring a constant current for recharging. The converter 10 includes an electromagnetic interference (EMI) filter 16 which is connected to a bridge rectifier 18 which, in turn, is connected to a two-switch non-isolated buck boost power stage 20 including a current sense 22 which may be a resistor, as disclosed in more detail below. The converter 10 also includes a bootstrap assist and start up means, such as a circuit, 24 which is connected to a high side and low side gate drive 26 and a power factor correction (PFC) transition mode (TM) control 28. The PFC transition mode control 28 is also connected to an error amplifier 30. An output of the high side and low side gate drive 26 is connected to the power stage 20. As will be understood, the arrows in FIG. 1 represent the direction in which data or signals are travelling, however it will be understood that some of the connections may be bi-directional. In one embodiment, the bootstrap startup and assist circuit 24 or component, the PFC TM control 28 and the error amplifier 30 may be seen as a controller 31 as shown in FIG. 3. An alternate embodiment may include a transient suppression circuit connected between the AC mains voltage input 12 and the EMI filter 16.

Turning to FIG. 3, a more detailed schematic diagram of the power factor corrected buck-boost converter 10 is shown. The AC mains voltage 12 provides an input voltage (seen as V500) to the EMI filter 16 which is connected to the bridge rectifier 18. The output of the bridge rectifier 18 is connected to the gate drive 26 and to the power stage 20.

The power stage 20 includes a first switch 32, an inductor 34 and a diode 36 which are connected in series between a positive output of the bridge rectifier 18 and the load 14. Between the bridge rectifier 18 and the load 14, there is also a set of components which are placed in parallel with each other. In the current embodiment, this parallel circuitry includes a diode 38, in parallel with a second switch 40 and a first sense resistor 42, in parallel with an output storage capacitor 44. A second sense resistor 46 is located in series between the parallel circuitry and the load 14. A high side output 48 of the gate drive 26 is connected to the first switch 32 and a low side output 50 of the gate drive 26 is connected to the second switch 40. An output of the controller 31 is connected to the gate drive 26. The controller 31 is also connected at various other contact points within the power factor converter as shown in FIG. 3 such as, but not limited to, a disable/enable signal 52 and an external reference 54.

In operation, the single-phase AC line voltage V500 is applied to the input of the power converter 10. The EMI filter 16 attenuates any EMI which is generated by the converter 10 when the voltage V500 is received. In the current embodiment, the bridge rectifier 18 rectifies the output of the EMI filter 16, however, it will be understood that any discrete rectifier component, such as a rectifier diode, may perform this function.

In the current embodiment, to begin a power conversion cycle, the two switches 32 and 40 are turned on by a gate drive signal from the controller 31, simultaneously causing current to flow through inductor 34 thereby increasing energy stored in the inductor 34. Diodes 38 and 36 are reversed biased during this state thereby decoupling the output storage capacitor 44 and the LED load 14 from the rectified line output of bridge rectifier 18.

The PFC TM control 28 controls the amount of energy delivered to the load 14 by controlling energy stored and corresponding current through inductor 34. When an appropriate or predetermined amount of energy is stored in inductor 34, switches 32 and 40 are simultaneously switched off. When the switches are turned off, the polarity of inductor 34 reverses and freewheeling diode 38 and rectifying diode 36 conduct and transfer the stored energy in the inductor 34 to the output storage capacitor 44 and LED load 14. In other embodiments the diodes 38 and 36 may be replaced by switches such as MOSFETs with a gate drive to allow the switches to be turned on and off at appropriate intervals.

The controller 31 comprises at least three components to assist in implementing the required control functions for the two-switch buck boost converter 20 with constant current output. In the preferred embodiment, the controller 31 includes PFC TM control 28, such as a ST Microelectronics L6562A, to implement power factor correction with an error amplifier 30 to regulate output current. Regulation of the output current is accomplished by the second sense resistor 46 connected in series with the LED load 14. The sensed voltage drop across the second sense resistor 46, which may be the current sense 22, is coupled back to the PFC TM control 28 via error amplifier 30 as part of a feedback loop. The bootstrap startup and assist circuit 24 comprises a unique means to facilitate the bootstrap technique for the high side switch 32 during initial power up of the converter 10.

The controller 31 may also receive the enable/disable function 52 to interrupt power to the output LED load 14 by terminating the switching action of the converter 10. The external reference 54 or external reference input, typically a reference voltage generated by the end user may be provided to program the required output current to a fixed value such as 350 mA or the external reference voltage can be varied to provide a simple means to dim the LED load.

Other embodiments may incorporate various control block functions, such as the bootstrap startup and assist circuit 24, the PFC TM control 28 and the error amplifier 30 as a monolithic integrated circuit. Alternate embodiments may have the external reference internal to the two-switch buck boost converter 10 where a fixed output current with no dimming and end user accessibility is required.

Figure 8:
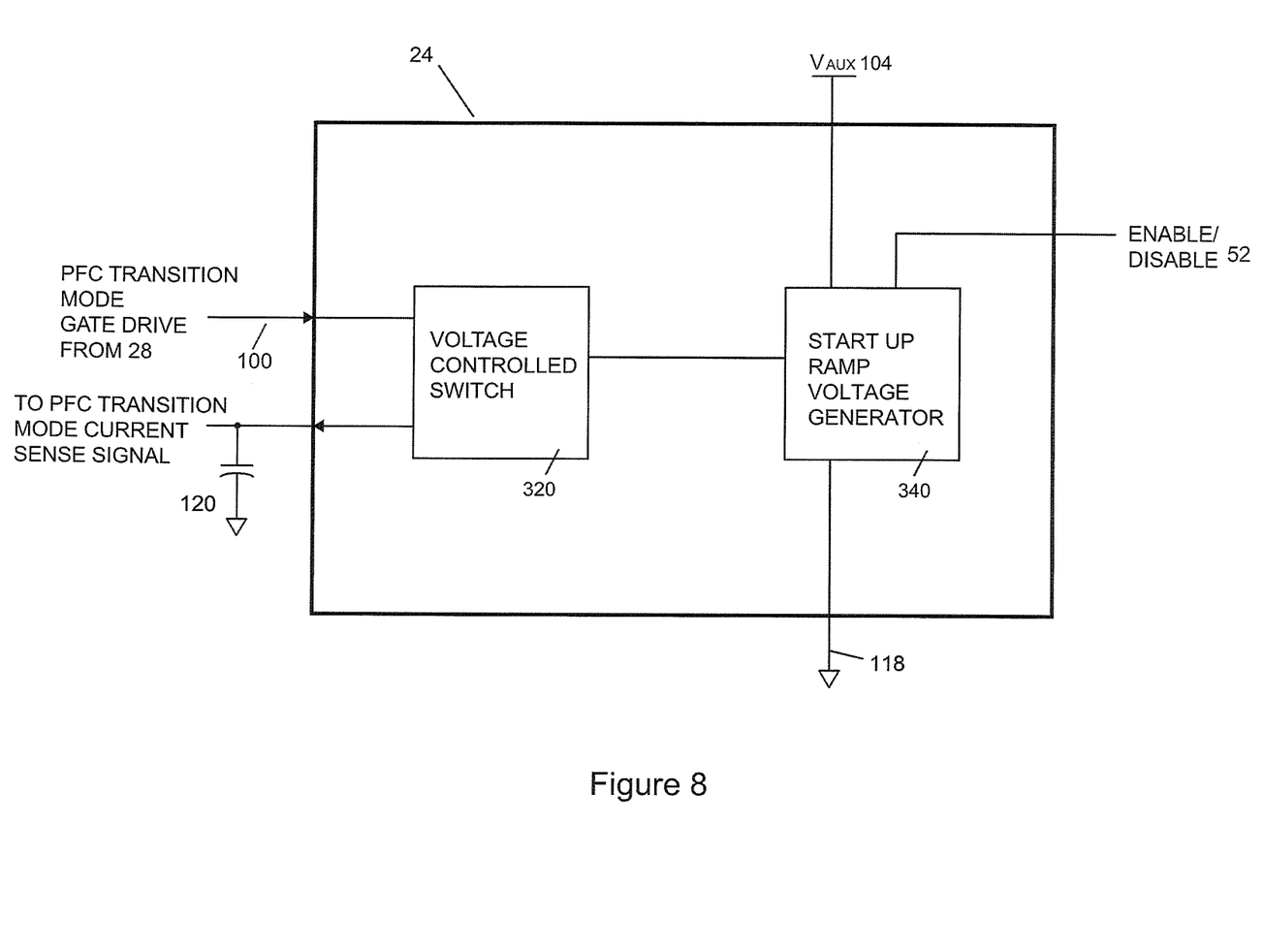
FIG. 8 is a schematic diagram of a bootstrap assist and start up circuit.

A schematic diagram of a bootstrap startup and assist circuit 24 is shown in FIG. 8. The bootstrap startup and assist circuit 24 includes a voltage controlled switch 320 which is connected to a start up ramp voltage generator 340. As will be described in more detail below, in one embodiment, the switch 320 comprises a diode and a transistor while the ramp up voltage generator 340 comprises a set of resistors and a capacitor. The voltage controlled switch 320 is connected to a PFC TM gate drive (shown in FIG. 4a) to receive an input from the gate drive and to couple the signal via the voltage controlled switch 320 to a PFC TM current sense signal (shown in FIG. 4a). The start up ramp voltage generator 340 is connected to Vauxiliary 104 and also to ground 118. In one embodiment, control of the start up ramp voltage generator 340 may be via the enable/disable signal 52. Alternate embodiments may include a means to couple the cathode of diode 80 as shown in FIGS. 4a and 4b to ground 118 in order to provide the enable/disable function.

Figure 2:
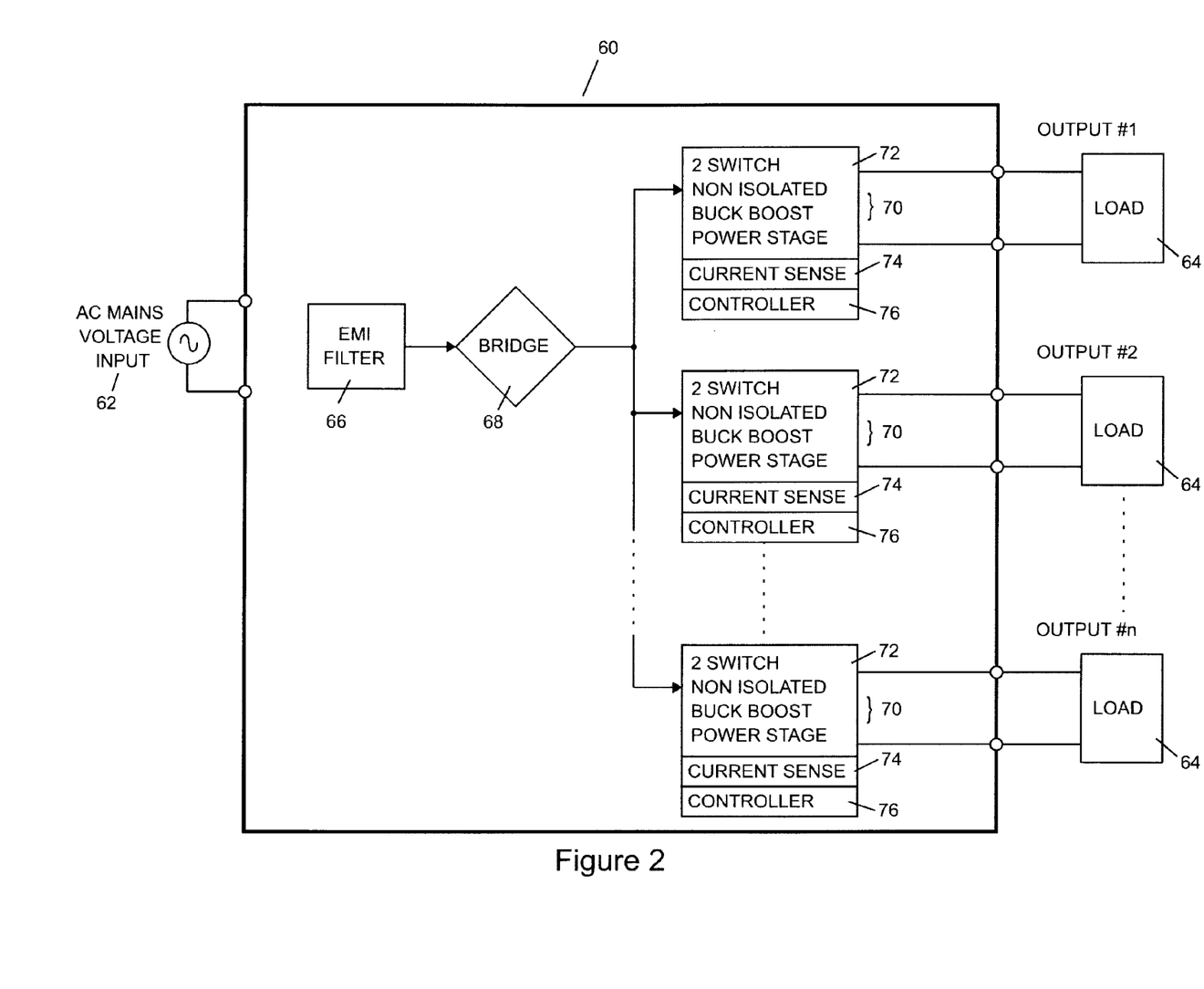
FIG. 2 is a block diagram of a power factor corrected buck-boost convertor with multiple constant current outputs.

Turning to FIG. 2, a schematic diagram of another embodiment of a power factor corrected buck-boost converter with multiple constant current outputs is shown. In this embodiment, the converter 60 receives an input from a power supply, such as an AC mains voltage input 62 and supplies an output to a plurality of loads 64. The converter 60 includes an EMI filter 66 which is connected to a bridge rectifier 68 which is connected to a plurality power conversion stages 70. In this embodiment, the number of power conversion stages 70 equals the number of loads 64.

Each power conversion stage 70 includes a two-switch non-isolated buck boost power stage 72, a current sense 74 and a controller 76. Although not shown, the converter also includes a controller 31 such as the one shown in FIG. 1 or 3.

Figure 4A:
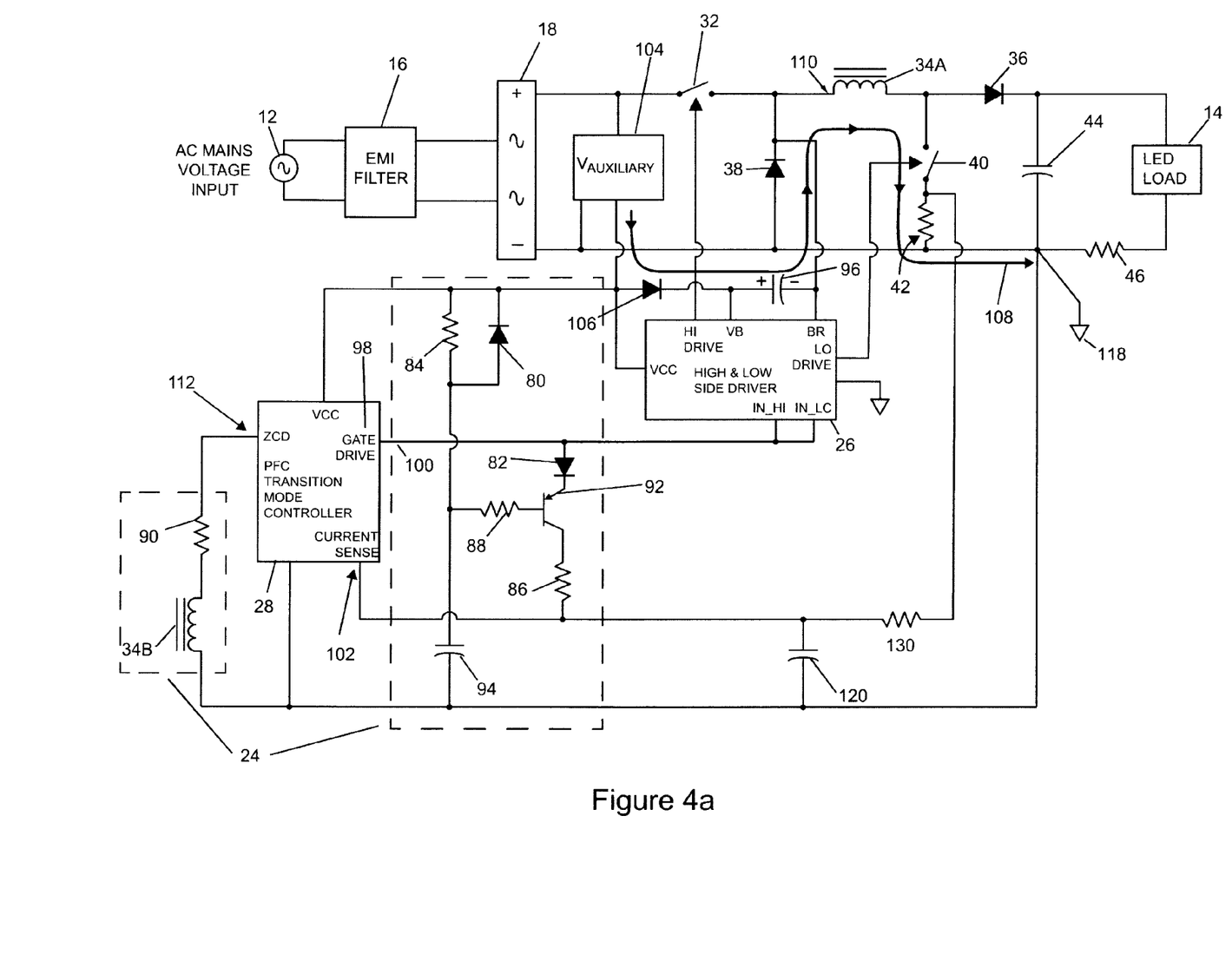
Figure 4B:
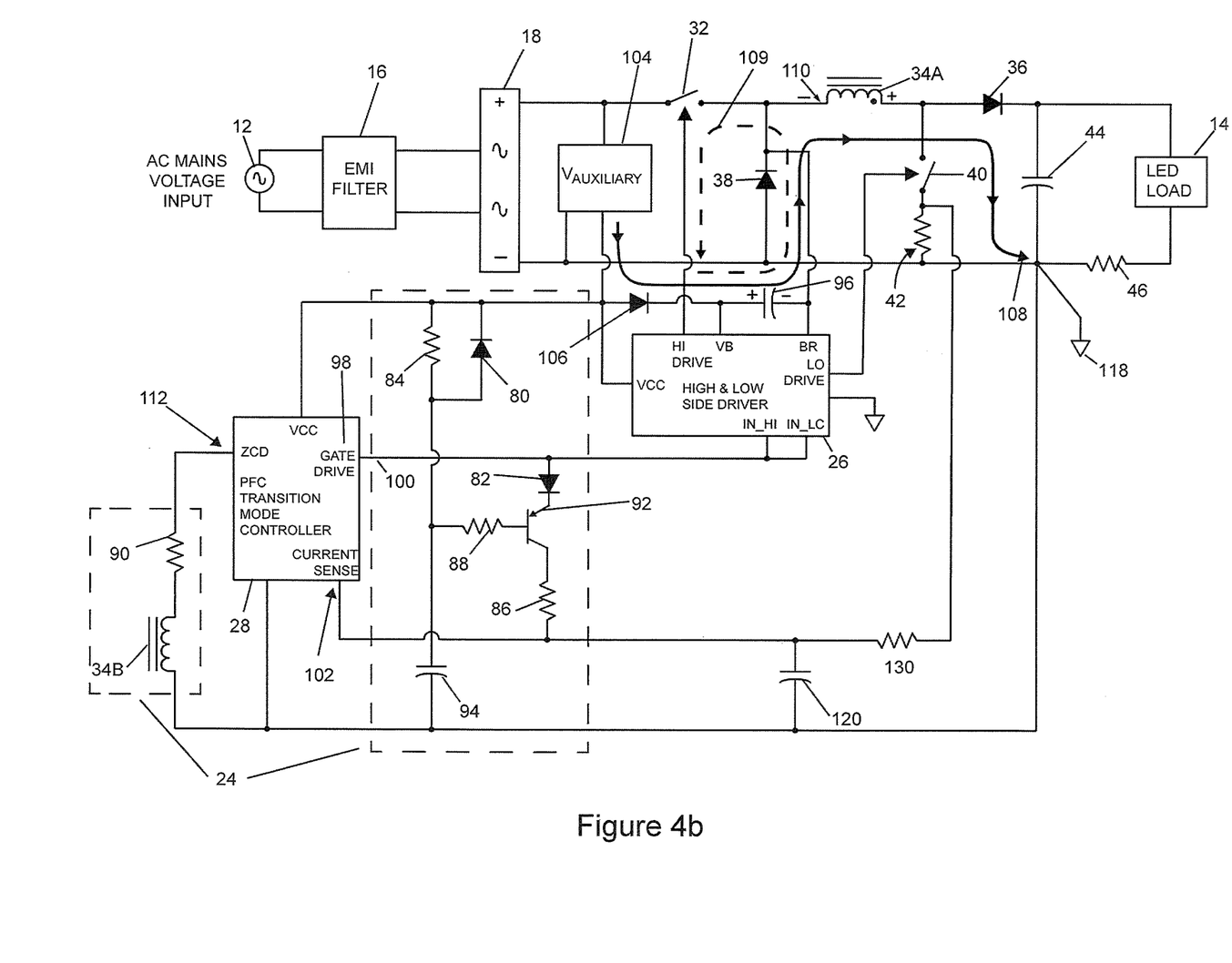
FIG. 4b is a schematic diagram of a bootstrap assist and start up circuit with a bootstrap capacitor charge with a low side switch off.

Turning to FIGS. 4a and 4b, more detailed schematics of the bootstrap startup and assist circuit 24 interacting with other components of the converter are shown. In FIG. 4a, the bootstrap startup and assist circuit 24 with a bootstrap capacitor charge is shown with a low side switch on 40 (arrow 108), and in FIG. 4b the bootstrap assist and start up circuit with a bootstrap capacitor charge is shown with a low side switch 40 off. In one embodiment, this circuit 24 is intended to overcome the shortcoming(s) of unpredictable and unguaranteed turn on of the high side switch, or MOSFET 32, during initial power up of the buck boost two-switch converter 10. FIGS. 4a and 4b show how the bootstrap startup and assist circuit 24 is coupled to the PFC TM control 28 and the high side, low side gate drive 26. The circuit 24 comprises a series of components such as diodes 80 and 82, resistors 84, 86, 88 and 90, transistor 92, capacitor 94 as well as the auxiliary winding of inductor 34 identified as 34b. In one embodiment, the voltage controlled switch 320 as shown in FIG. 8 comprises diode 82 and transistor 92 while the start up ramp voltage generator 340 comprises capacitor 94 and resistors 84 and 88. While FIG. 4a shows a specific circuitry and set up of the components for implementing the circuit 24, it will be understood that other components providing the equivalent functionality and properties of components 80 to 94 and 34*b* may be contemplated.

During continuous steady state operation, the bootstrap technique as applied to a buck-boost two switch converter requires a bootstrap capacitor 96 to be charged when both high side 32 and low side 40 switches are simultaneously turned off Subsequently, when the gate drive of both switches is turned on, the bootstrap capacitor voltage is level shifted across the high side switch in order to turn it on.

If the bootstrap startup and assist circuit 24 is not implemented during start up of the power converter, charging of the bootstrap capacitor 96 may be unpredictable and not guaranteed. Referencing FIGS. 4*a* and 4*b*, the PFC TM control 28 turns its gate drive signal 100 (via gate drive 98) on or active high, after detecting a demagnetization of inductor 34 and then compares a voltage across first sense resistor 42 (which represents the current through a primary winding 34*a* of inductor 34) to a current demand signal to terminate the gate drive signal 100. Due to the lack of charge on bootstrap capacitor 96 and resultant lack of charge to turn the high side switch 32 on, no current flows through the primary winding 34*a*, the second switch 40 or the first sense resistor 42. The resulting lack of voltage across the first sense resistor 42 results in a corresponding lack of voltage at the current sense input 102 of the PFC TM control 28 causing the gate drive signal 100 to stay high. This operating characteristic of the PFC TM control 28 is effectively overcome when utilized in conjunction with the bootstrap startup and assist circuit 24 to provide a method to charge the bootstrap capacitor 96 during startup.

In the preferred embodiment, the bootstrap startup and assist circuit 24 facilitates the charging of the bootstrap capacitor 96 during the initial power up of the converter by causing the PFC TM control 28 to generate narrow gate pulses even though no current is detected across the first sense resistor 42.

During the initial startup of the converter, the bootstrap startup and assist circuit 24 terminates the gate drive signal, or pulse, 100 by forcing the current sense pin 102 of the PFC TM control 28 above a desired current demand signal. Initially, very narrow gate drive pulses are generated over the startup period to pulse the low side switch 40 on and off several hundred times causing energy to build up in inductor 34 and bootstrap capacitor 96.

Figure 5:
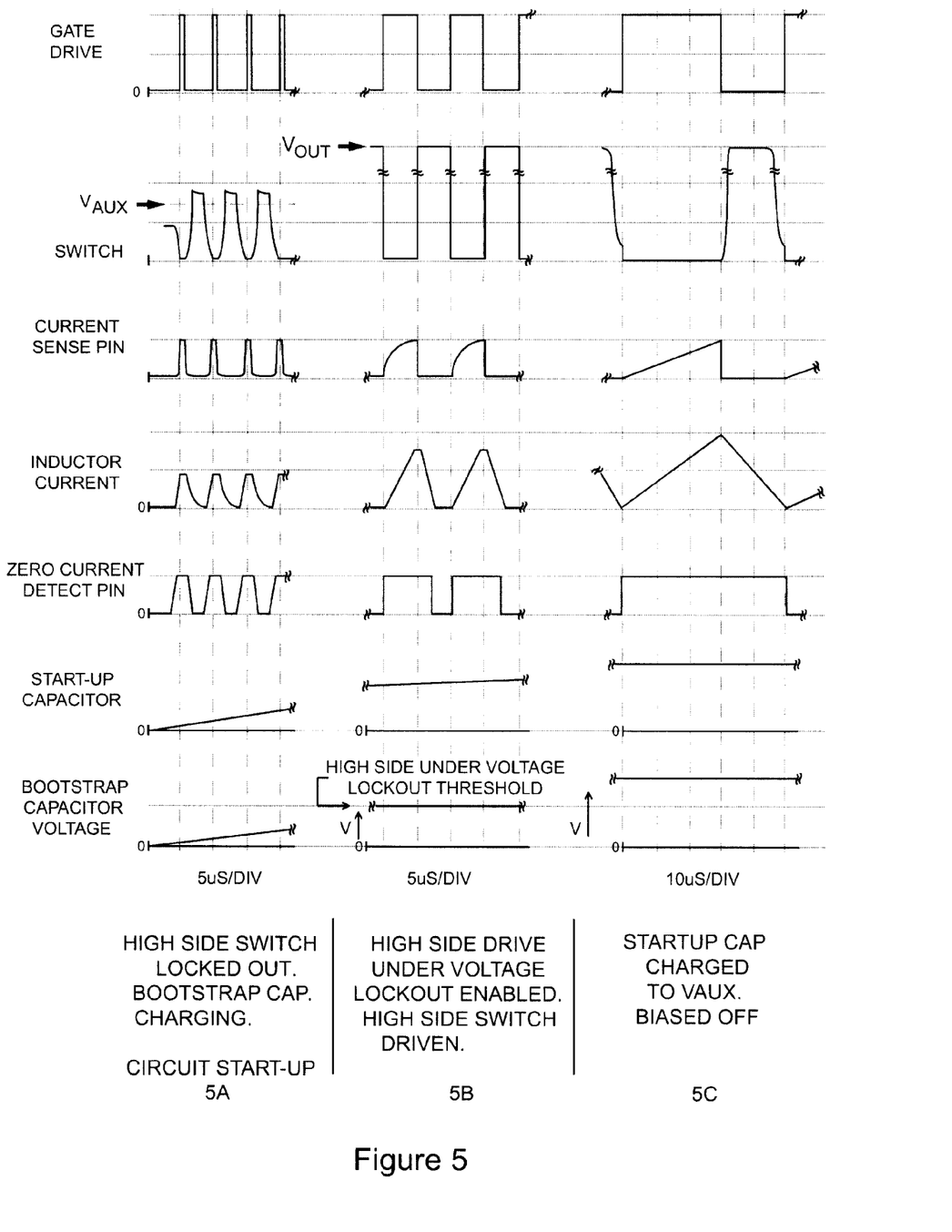
FIG. 5 is a schematic diagram of bootstrap assist and start up circuit waveforms.

As shown in FIG. 5, which are a series of waveforms during an initial start up period, an under voltage lockout function within the high side and low side drive 26 reduces the likelihood of or prevents the high side switch 32 from being driven until bootstrap capacitor 96 has charged to a sufficient voltage. This allows for continued charging of bootstrap capacitor 96 as described below.

As shown in FIG. 4*a*, when low side switch 40 turns on, current flows from Vauxiliary (an auxiliary voltage source) 104 through diode 106, and bootstrap capacitor 96 via the primary winding 34*a* of the inductor 34 and low side switch 40 and first sense resistor 42 to ground 118 (as reflected by arrow 108).

As shown in FIG. 4*b*, when the low side switch 40 turns off, the polarity of the primary winding 34*a* of the inductor 34 reverses, freewheeling diode 38 conducts and energy is transferred to the output filter capacitor 44. Note that no energy is initially transferred to the load 14 until the voltage across capacitor 44 is greater than the forward voltage drops of the LED load 14. As freewheeling diode 38 conducts, it clamps one end of inductor 34*a* at node 110 to ground 118 allowing bootstrap capacitor 96 to continue to charge via Vauxiliary 104 and diode 106 (as shown by 109).

Eventually, the energy in inductor 34*a* is depleted as current decreases to zero and the voltage across the primary winding 34*a* collapses. The inductor auxiliary winding 34*b* is coupled to a zero current detector (ZCD) pin 112 of the PFC TM control 28 which detects zero current and switches on the gate drive signal of 100 which in turn switches low side switch 40 on.

As further shown in FIG. 5, this repetitive pulsing of the low side switch 40 continues to charge bootstrap capacitor 96 while the under voltage lockout function of the high/low side drive 26 disables the high side gate drive to switch 32. When the voltage across capacitor 96 reaches a lockout enable threshold, the high/low side drive 26 enables the high side drive to level shift the bootstrap capacitor 96 voltage across high side switch 32. At this stage, the two switch buck boost converter has reached its on state and the freewheeling action of diode 38 is able to continually recharge the bootstrap capacitor 96 when both high side and low side switches 32 and 40 are turned off.

The bootstrap startup and assist circuit 24 includes an RC time constant provided by resistor 84, resistor 88 and capacitor 94 which determines the time period that narrow gate drive pulses are applied to the low side switch 40 during start up. This RC time constant is sufficient to allow many hundreds of gate pulses to be applied to the current sense pin 102.

At initial power up of the buck boost converter 10, the capacitor 94 within the start up circuit 24 is at zero volts. PFC TM control 28 starts when Vauxiliary 104 is applied to it and asserts the gate drive signal 100 active high which forward biases transistor 92. Collector current from transistor 92 flows through resistor 86, resistor 130 and capacitor 120 causing the voltage across the capacitor 120 to ramp up at a time constant (RC) of resistor 86 times capacitor 120.

The voltage divider ratio of resistor 86 and resistor 130 is selected to have an appropriate voltage developed at the current sense pin 102 of PFC TM control 28 and is used to terminate the gate drive pulse 100. The pulse width of the gate is thus narrow and its duration is a function of the leading edge blanking circuit within PFC TM control 28 typically greater than 200 ns. After the gate drive pulse 100 is terminated, the ZCD pin 112 waits for a negative leading edge which is developed due to the demagnetizing of inductor 34. Once this signal is detected, the gate drive signal 100 is asserted once again. This cycle repeats several hundred times as the capacitor 94 charges toward a value of Vauxiliary 104 via resistor 84. As the capacitor 94 charges, the voltage across it increases until it reverse biases transistor 92. When capacitor 94 is charged to the Vauxiliary rail, the transistor is completely reversed biased decoupling the gate drive pulses 100 from the current signal sensing performed by the current sense pin 102 of the control 28.

To reset the bootstrap startup and assist circuit 24, diode 80 discharges capacitor 94 when the Vauxiliary 104 has been removed. In other embodiments, the enable/disable signal 52 could be implemented to reset the bootstrap startup and assist circuit 24.

Figure 6:
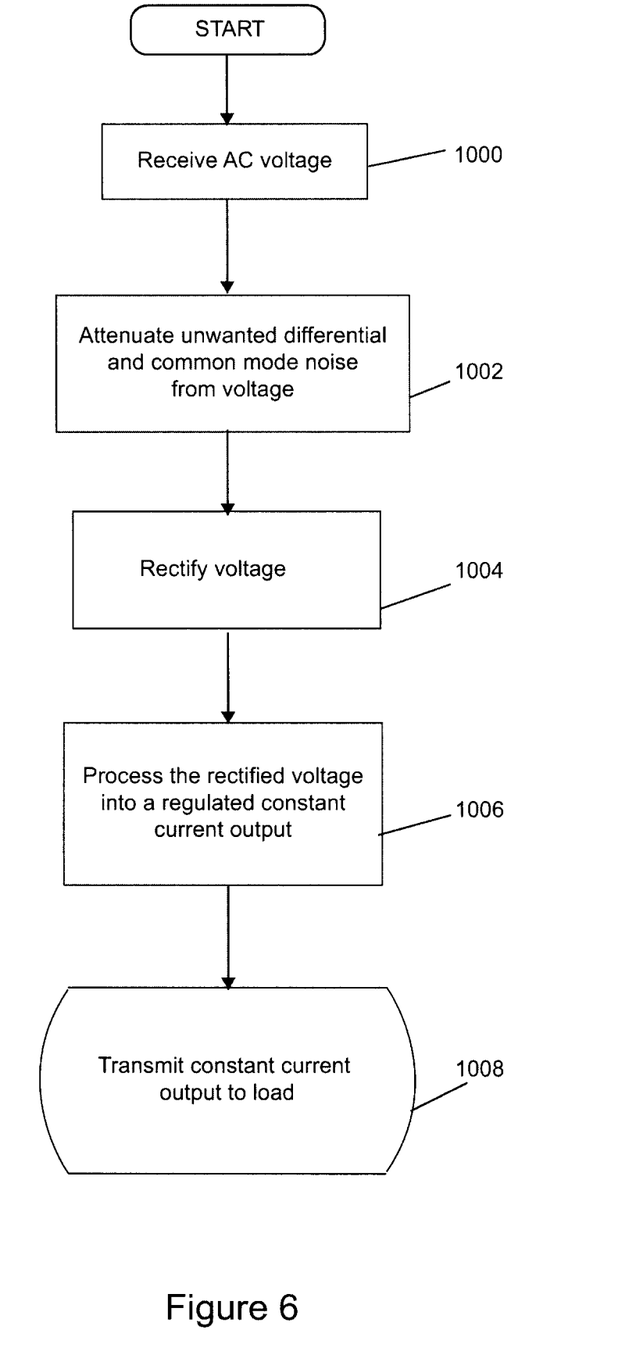
FIG. 6 is a flowchart outlining a method of non-isolated power factor corrected buck-boost power converting with constant current output.

Turning to FIG. 6, a method of providing a constant current output to an LED load is shown. In operation, an AC voltage is applied to, or received by 1000, the converter. After receiving the AC voltage from an AC mains voltage input, the EMI filter filters 1002 the signal. In one embodiment, the filtering attenuates the unwanted differential and common mode noise that is generated by the converter and coupled or fed back to the voltage input. The output of the EMI filter is then rectified 1004 by the bridge rectifier. The output of the bridge rectifier is then processed 1006 to produce a regulated constant current output. The current output is the supplied 1008 to a load, such as a high brightness LED, which requires a constant current output.

Figure 7:
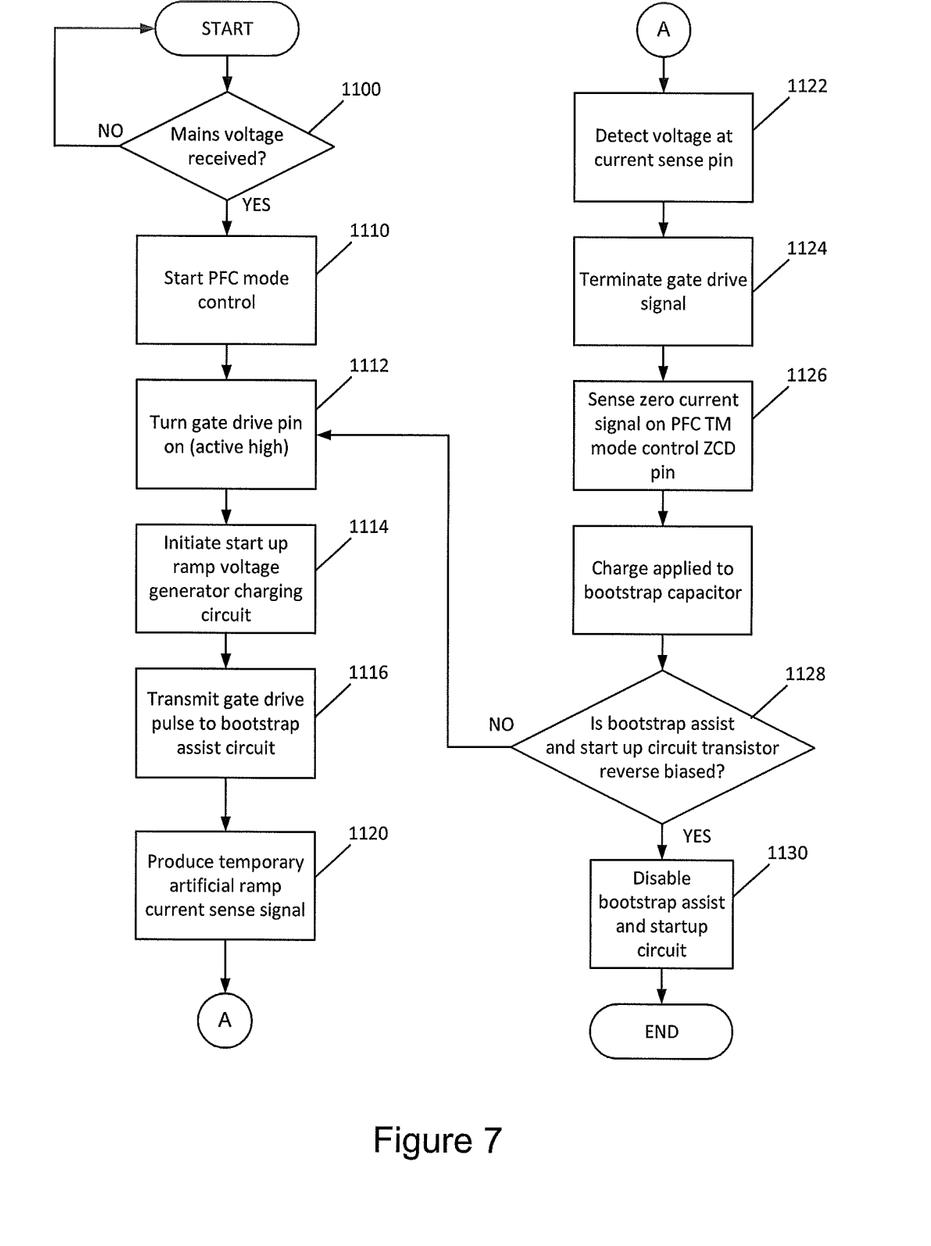
FIG. 7 is a flowchart outlining a method of bootstrap assisting.

Turning to FIG. 7, a flowchart outlining a method of bootstrap startup and assist during initial startup of power converter is shown. Initially, after receiving an AC mains voltage 1100, the PFC TM control starts up 1110 and provides 1112 an active high state, such as a positive pulse, on its gate drive pin. The voltage ramp circuit begins charging by means of the circuit comprising resistor 88, resistor 84 and capacitor 94.

The gate drive signal is then applied 1116 to the voltage controlled switch 92 of bootstrap startup and assist circuit 24. The voltage controlled switch is where the transistor 92 is in a common base configuration and where the transistor base voltage exponentially rises, via the charging of the capacitor 94 within the bootstrap startup and circuit 24 from base current delivered via the forward biased junction of the transistor 92 from the gate drive signal 100.

An artificial current ramp sense signal is then produced 1120. In one embodiment, this is accomplished by the current through the collector of transistor 92 which creates the artificial ramp current sense signal from an RC constant between resistor 86 and capacitor 120 connected to the current sense pin 102 of the PFC TM control 28. When a voltage is then detected 1122 at the current sense pin 102, the gate drive signal pulse 100 is terminated 1124.

When a zero current signal is sensed 1126 by the PFC TM control 28, via the zero current detector sense pin 112, further monitoring is performed to determine if the transistor 92 in the bootstrap startup and assist circuit 24 is reverse biased 1128. If the transistor 92 is not reverse biased, the artificial ramp current sense signal is produced 1120 again. However, if the transistor 92 is reverse biased, the bootstrap startup and assist circuit 24 is disabled 1130.

In the preceding description, for purposes of explanation, numerous details are set forth in order to provide a thorough understanding of the embodiments. However, it will be apparent to one skilled in the art that other arrangements and embodiments would be feasible.

The above-described embodiments are intended to be examples only. Alterations, modifications and variations can be effected to the particular embodiments by those of skill in the art without departing from the scope of the application, which is defined solely by the claims appended hereto.

What is claimed is:

1. A method of bootstrap startup comprising:
   receiving an input signal to begin bootstrapping;
   initiating a startup voltage ramp;
   initiating an artificial ramp current sense;
   determining if a voltage controlled switch is reverse-biased; and
   terminating the artificial ramp current sense if the voltage controlled switch is reverse-biased.

2. The method of claim 1 wherein if the voltage controlled switch is not reverse-biased, repeating initiating the artificial ramp current sense and determining if the voltage controlled switch is reverse-biased until it is determined that the voltage controlled switch is reverse-biased.

3. The method of claim 1 wherein initiating a startup voltage ramp comprises:
   transmitting a current through an RC time constant.

4. The method of claim 1 wherein initiating the artificial ramp current sense comprises:
   turning on a gate drive signal from a power factor corrected (PFC) transition mode (TM) control.

5. The method of claim 1 wherein initiating the artificial ramp current sense comprises:
   detecting a voltage at a current sense pin within a power factor corrected (PFC) transition mode (TM) control.

6. The method of claim 1 wherein initiating the artificial ramp current sense comprises:
   detecting a signal at a zero current detector within a power factor corrected (PFC) transition mode (TM) control.

7. The method of claim 1 wherein initiating an artificial ramp current sense comprises:
   coupling a gate drive signal of a power factor corrected (PFC) transition mode (TM) control with a current sense of the PFC TM control.

\* \* \* \* \*